United States Patent
Guletsky et al.

(10) Patent No.: US 6,873,444 B1
(45) Date of Patent: Mar. 29, 2005

(54) VOLUME HOLOGRAMS IN TRANSPARENT MATERIALS

(75) Inventors: Nikolay Nikolaevich Guletsky, St. Petersburg (RU); Vladimir Yurevich Dmitriev, St. Petersburg (RU); Sergey Viktorovich Oshemkov, St. Petersburg (RU)

(73) Assignee: U. C. Laser Ltd., Carmiel (IL)

( * ) Notice: Subject to any disclaimer, the term of this patent is extended or adjusted under 35 U.S.C. 154(b) by 61 days.

(21) Appl. No.: 10/069,253

(22) PCT Filed: Aug. 7, 2000

(86) PCT No.: PCT/IL00/00481

§ 371 (c)(1),
(2), (4) Date: Jul. 23, 2002

(87) PCT Pub. No.: WO01/14937

PCT Pub. Date: Mar. 1, 2001

(30) Foreign Application Priority Data

Aug. 24, 1999 (IL) ................................. 131575

(51) Int. Cl.[7] ................................. G03H 1/08
(52) U.S. Cl. ................................. 359/9; 359/11; 359/27; 359/32; 359/35; 359/900
(58) Field of Search ................................. 359/9, 11, 27, 359/32, 35, 900; 365/49

(56) References Cited

U.S. PATENT DOCUMENTS

| | | |
|---|---|---|
| 5,157,674 A | 10/1992 | Lawandy |
| 5,253,198 A | 10/1993 | Birge et al. |
| 5,289,407 A | 2/1994 | Strickler et al. |
| 5,291,317 A | 3/1994 | Newswanger |
| 5,325,324 A | 6/1994 | Rentzepis et al. |
| 5,450,218 A | 9/1995 | Heanue et al. |
| 5,515,183 A | 5/1996 | Hashimoto |
| 5,592,313 A | 1/1997 | Hart |
| 5,745,267 A | 4/1998 | Hart |
| 5,761,111 A | 6/1998 | Glezer |
| 5,786,560 A | 7/1998 | Tatah et al. |
| 5,932,119 A | 8/1999 | Kaplan et al. |
| 6,087,617 A * | 7/2000 | Troitski et al. .......... 219/121.6 |

FOREIGN PATENT DOCUMENTS

| | | |
|---|---|---|
| FR | 2 287 713 | 5/1976 |
| RU | 2008288 | 2/1994 |
| WO | WO 94/14567 | 7/1994 |

OTHER PUBLICATIONS

B.R. Brown, et al., "Complex Spatial Filtering with Binary Masks", Published in Applied Optics, vol. 5, p. 967ff, 1966.
W.H. Lee, "Binary Synthetic Holograms", Published in Applied Optics, vol. 13, p. 1677ff, 1974.
W.T. Cathey, "The Effect of Finite Sampling in Holography", in Optik, vol. 27, p. 317ff, 1968.
J.P. Allebach, et al., "Aliasing Error in Digital Holography", in Journal of Applied Optics, vol. 15, p. 2183ff, 1976.
J.W. Goodman, et al., "Some Effects of Fourier Domain Phase Quantization", in IBM Journal of Research and Development. vol. 14, p. 478ff, 1970.

(Continued)

Primary Examiner—Audrey Chang
Assistant Examiner—Craig Curtis
(74) Attorney, Agent, or Firm—Fulbright & Jaworski L.L.P.

(57) ABSTRACT

This invention discloses a method of producing, in a solid transparent material (3), a hologram of an object; the method includes the steps of: developing a three-dimensional mathematical model of an electro-magnetic field emanating from the object, the field producing an image of the object; computing a corresponding three-dimensional set of points, light scattered from which reconstructs the field; and focusing a pulsed laser beam into the solid transparent material onto each of the points sequentially, the beam being capable, when focused, of causing optical breakdown in the solid transparent material.

8 Claims, 4 Drawing Sheets

OTHER PUBLICATIONS

P.S. Naidu, "Quantization Noise in Binary Holograms", in Optics Communications, vol. 15, p. 361ff, 1975.

B.R. Brown, et al., "Computer Generated Binary Holograms", Published in IBM Journal of Research and Development, vol. 13, p. 168ff, 1969.

Yu. N. Denisyuk, "On the Reproduction, of the Optical Properties of an Object as Mirrored in the Wave Field of its Scattered Radiation", Published in Optics and Spectroscopy, vol. 15, pp. 522–532, 1962.

D. Brown, et al., "Multi–Element Diffractive Optical Designs Using Evolutionary Programming", Published in SPIE, vol. 2404, pp. 17–27, 1995.

Van Heerden, "Note on Optical Information Storage in Solids", Published in Applied Optics, 2, pp. 764ff, 1963.

Kazanskly, N L et al., "Computer–Aided Design of Diffractive Optical Elements", Optical Engineering, vol. 33, No. 10, Oct. 1994, pp. 3156–3166.

Nordin G P et al., "Diffraction Properties of Stratified Voloume Holographic Optical Elements", Journal of the Optical Society of America –A, Optical Society of America, Washington, US, vol. 9, No. 12, Dec. 1992.

Spariosu K et al., "Stratified Volume Diffractive Elements: Modeling and Applications", Proceedings of the SPIE, SPIE, Bellingham, VA, US, vol. 3133, Jul. 1997.

* cited by examiner

VOLUME HOLOGRAMS IN TRANSPARENT MATERIALS

FIELD OF THE INVENTION

The present invention relates to the field of the production of volume holograms in transparent materials, especially by means of digital laser engraving at very high energy densities.

BACKGROUND OF THE INVENTION

An object can be seen if it reflects, scatters or radiates light. This light can be described by a set of waves of an electromagnetic field. If the same electromagnetic field, called hereinafter in this specification, the model field, were to be recreated by other means, an observer would see the same image. The simplest way of creating a copy of a model field is by means of a photograph. This method provides a copy of the field intensity distribution in the lens focal plane, but does not save the field phase distribution. Phase distribution contains information about location in object space. That is why a true image can be seen only from one viewpoint.

A method of preserving this phase information in the copy of the model field is by means of a hologram. The first holograms were formed by Gabor in research on reducing the aberrations in electron microscopes. A simple hologram can be produced by illuminating the object with coherent light, and using the same light as a reference field to produce an interference pattern inside the photographic recording material. Under the appropriate conditions, the resulting photograph will memorize both the intensity and phase information of the model field. In conventional holography, this information is read using the same beam of coherent light as was used for the reference light.

Let $U(\bar{r}) = u(\bar{r})e^{i(u(\bar{r}) - \omega t)}$ represent the field reflected or scattered by the object, the model field, and let $U^0(\bar{r}) = u^0 e^{i(\bar{k}^0 \bar{r} - \omega t)}$ represent the plane reference field, where:

F is the radius vector, $\bar{k}^0$ is the wave vector, $\omega$ is the frequency, $v(F)$ is the phase, and $u(F)$ is the amplitude of the model field.

The resulting field on the surface of the photograph is given by:

$$\Phi(x,y) = u(x,y)e^{i(v(x,y) - \omega t)} + u^0 e^{i(k^0_y y - \omega t)}$$

and the average intensity of field is given by:

$$I(x,y) = u(x,y)^2 + (u^0)^2$$

$$+ u(x,y)u^0(e^{i(v(x,y) - k^0_x x + k^0_y y)}$$

$$+ e^{-i(v(u(x,y) + k^0_x x + k^0_y y)})$$

where:

x and y are the co-ordinates of the point on the two-dimensional photograph where the field is calculated, u(x,y) is the projection of u(F) onto the plane of the photograph, and $k_x$ and $k_y$ are the projections of the wave vector onto the x- and y-axes.

Assuming that the transparency of the resulting holographic photograph is proportional to the square of the exposure. When illuminated by the reference field $U^0(F)$, three waves result, as is well known in the art. The first is a simple forward scattered wave, the modulated reference field. The second is a virtual image, normal to the surface of the photo. The third is a copy of the required model field.

Mathematically, the resulting holographic photograph of the interference pattern can be considered to be a Fourier representation of the model field. The model field is generated by interference of the reference light beam with the hologram. The resulting image is produced in practice, by light scattered from a predefined set of tiny crystals within the hologram photographic recording material, each with different size and density.

Holographic images are three dimensional and remarkably realistic. The original uses of holography in imaging and display applications has now grown to include applications such as optical, RF and acoustic filtering, holographic image processing, holographic or diffractive optical elements including lenses, aspherical optics, beam splitters and aberration correctors, night vision devices, helmet displays, memory devices, phase contrast microscopy, optical disc readouts and many others.

The problem with the prior art conventional method of producing holograms on photographic recording materials, is that it requires the use of a complex optical set-up, with coherent writing and reading beams for respectively producing and displaying the holograms. A number of methods and apparatus have been described in the prior art for producing holograms using light-sensitive materials. For example, U.S. Pat. No. 5,291,317 on "Holographic diffraction grating patterns and methods for creating the same" to C. Newswanger describes methods and apparatus for creating a plurality of holographic diffraction grating patterns in a raster scan fashion. U.S. Pat. No. 5,592,313 on "Methods and apparatus for making holograms including a variable beam splitter assembly" and U.S. Pat. No. 5,745,267 on "Apparatus for making holograms", to S. J. Hart describe methods for producing composite holograms using substantially planar, photo-sensitive substrates. A real-time holography system using a CCD camera as the photo-sensitive recording medium, is described by N. Hashimoto in U.S. Pat. No. 5,515,133 "Real time holography system".

Furthermore, such holograph production methods require either the presence of the object sample itself or involve a complicated method of wave construction for synthetically reconstructing the object beam. This wave reconstruction could include beam splitting, amplitude transformation, phase processing, followed by recombination of the reconstructed object beam with the reference beam to form the interference pattern. This has limited the use of holograms, because of the complexity and high precision of the optical equipment required to produce them. There is therefore a widespread need for a novel method of producing holograms in transparent materials, without the need for complicated optical interference arrangements, thereby reducing the complexity and cost of production of such holograms.

Computer generated holograms, hereinafter CGH's, have been described by B. R. Brown and A. W. Lohmnann in the article "Complex Spatial Filtering with Binary Masks", published in Applied Optics, Vol. 5, p. 967ff, (1966). The CGH's described therein were used for optical spatial filtering. The hologram is represented by assigning field values to discrete pixels. The number of values is dependent on the size of the image and its resolution. Pixel values can be calculated by means of scalar diffraction theory and form a Fourier transform of the model field. In evaluating the Fourier series, some approximations are necessary. One of these approximations, known as the Detour phase error, has given its name to a common CGH variant. Other approaches have also been developed and the resulting holograms known as Nondetour Holograrns. Some such CGH's are described in the article entitled "Binary Synthetic Holograms" by W. H. Lee published in Applied Optics, Vol. 13, p. 1677ff, (1974).

Three main features of a CGH should be emphasized:
(a) neither object nor reference field need really exist, such that any convenient mathematical representation of the object and any reference wave front can be utilized;
(b) the calculation is essentially the evaluation of the inverse diffraction effect, in that the diffracted field is given and the pixel values of the holograph need to be calculated;
(c) the mathematical nature of a CGH enables the construction of idealized images and filters, by means of compensation for such effects as beam aberrations, system noise, beam divergence, beam phase shift, and others.

A number of different artifacts and aliases are produced as a result of the discrete nature of defining the value assigned to each pixel, such as because of the finite number of pixel positions, their coherent positioning and the quantization of the pixel values. Such effects are well documented in the prior art, in a number of publications, such as "The Effect of Finite Sampling in Holography", by W. T. Cathey, in Optik, Vol. 27, p. 317ff, (1968); "Aliasing Error in Digital Holography" by J.Buklew and N. C. Galaher, in Journal of Applied Optics. Vol. 15, p. 2183ff, (1976); "Some Effects of Fourier Domain Phase Quantization" by J. W. Goodman and A. M. Silvestri, in IBM Journal of Research and Development, Vol. 14, p. 478ff, (1970); and "Quantization Noise in Binary Holograms" by P. S. Naidu, in Optics Communications, Vol. 15, p. 361ff, (1975).

Specific mathematical techniques have been described, for reducing these effects, such as those described by B. R. Brown and A. W. Lohmann in "Computer Generated Binary Holograms", published in the IBM Journal of Research and Development, Vol. 13, p.168ff, (1969), and by J.Buklew and N. C. Galaher, Jr., in "Comprehensive Error Models and a Comparative Study of Some Detour Phase Holograms", published in Applied Optics, Vol. 18, p.286lff, (1979).

The main lirmitation of prior art CGH's is that they can only be constructed using two dimensional recording techniques. such as surface chemical etching, lithography, ion etching, electron beam processing and silk screen printing. Hence such a CGH represents only a two dimensional slice of a complete volumetric interference pattern. As has been shown by Yu. N. Denisyuk in the article "Optical Properties of an Object as Mirrored in the Wave Field of its Scattered Radiation", published in Optics and Spectroscopy, Vol. 15, pp. 522–532, (1963), unlike the case of three-dimensional volume holographs, for such a 2-D holograph, this means that there is no difference between direct and inverse wave propagation, that a virtual image always exists, and that there is no wavelength selectivity. Consequently, such a CGH is limited and can produce only a monochrome image or holographic optical element, HOE.

There therefore exists a serious need for a method of production of computer generated volume holograms, which overcome the disadvantages and drawbacks of prior art holograms.

The disclosures of all publications mentioned in this section and in the other sections of the specification, and the disclosures of all documents cited in the above publications, are hereby incorporated by reference.

SUMMARY OF THE INVENTION

The present invention seeks to provide a new method of producing volume holograms in transparent materials, by creating inside the material a set of scattering centers, which produce a copy of the required model field by diffraction of illuminating light therefrom. The position of every point of this set of scattering centers is computed, in order to solve the problem of the inverse reconstruction of the required model field by means of a set of secondary waves of scattered light. This can be performed in a direct way, for example by use of a commercial ray-tracing program, such as the Honeywell Ray-tracing CAD, manufactured by Honeywell Systems and Research Center of Minneapolis, Minn., USA, or by use of the genetic algorithm method described by D. Brown and A. Kathman in the article "Multi-element diffractive optical designs using evolutionary programming", published in SPIE, Vol. 2404, pp. 17–27, (1995).

Alternatively and preferably, this computation can be performed in an indirect way by sampling and quantization of the imaginary interference pattern produced between the reference light beam and the light scattered from the object. The scattering centers so computed are then produced serially by means of a suitable laser intravolume engraving process. For this reason, these holograms are termed Computer Generated Volume Holograms, CGVH. Such holograms show distinct advantages over the prior art analog holograms produced within three-dimensional photographic media, using methods involving the interference of light beams, and over the prior art computer generated holograms, which are limited to two-dimensional holograms.

Without getting involved in the mathematical details of diffraction theory, the process can be visualized by analogy with the well-known effect of the polychrornatic iridescent appearance of compact discs (CD's) when viewed in white light. Data records on the surface of CD's are formed by a series of pits having a low reflection coefficient. These pits are produced directly by laser thermoplastic etching, or by a polycarbonate injection molding process using a master copy previously created by laser etching. Usually there is no correlation of pit position along the track The polychromatic iridescent appearance of the CD is due to the diffraction of illuminating light from the coherent arrangement of pit tracks next to each other. A mathematical evaluation shows that in order to obtain this effect, there need to be several hundred pits in one coherence length of the illuminating light. The size of typical CD pits varies from 0.75 $\mu$to 1.5 $\mu$, and the distance between them varies from 1 $\mu$ along the track length to 2.5,$\mu$ between adjacent tracks. The coherent length of sunlight is typically of the order of 1 mm. Hence, the pit density of a typical CD is twice as high as that required to produce the characteristic polychromatic iridescent appearance of the CD in natural light. The method of intravolume laser engraving in transparent media differs in some technical aspects from that of laser surface etching, but the resulting pits are of similar size and the resulting diffraction effects should thus also be similar. The principal difference is that the use of intravolume laser engraving allows the performance of true 3-D engraving. An analogy can be found in the prior art, in the difference between a conventional 2-D Gabor hologram and a 3-D Lipman-Denisyuk hologram as described by Denisyuk in op. cit. This difference is analyzed by Van Heerden in the article "Theory of optical information storage in Solids", published in Applied Optics, 2, pp.764ff, (1963). The 3-D CGVH, constructed and operative according to the present invention, enables the production of achromatic HOE's and of fully colored images.

There is thus provided, in accordance with a preferred embodiment of the present invention, a method for producing computer generated intravolume holograms inside transparent materials by means of the controlled production of scattering centers through optical breakdown in the material resulting from the focusing of high intensity laser pulses.

The method involves the focusing of the beam from a laser emitting ultra-short pulses of the order of tens of picoseconds or less, into the volume of the transparent material by means of a high quality objective lens, such that a focal spot close to the diffraction limit for the laser wavelength is obtained within the material. At very high power densities, of the order of $10^{13}$ Watts/cm$^2$, the material undergoes optical breakdown, since the power density of the focused beam far exceeds the threshold above which non-linear effects occur in the transmission properties of the otherwise transparent materials, and the material strongly absorbs the focused beam. Because of the intense power density, atomic and molecular bonds of the material are broken down, and the material decomposes almost instantaneously into its basic components, generally highly ionized component atoms, leaving behind a tiny diffuse scattering center. The production of such optical breakdown damage centers has been described in Russian Patent No. RU 2,008,258 to S. V. Oshemkov, one of the current applicants, entitled "Process for Laser Forming of Images in Solid Media", hereby incorporated by reference. The term pixel is used herewithin to denote the optical breakdown damage zone constituting such a scattering center.

The accuracy of the arrangement of pixels inside a transparent material depends on the quality of the optical and mechanical beam positioning system, and on the size of the pixels produced. In practice, with good focusing optics, it is possible to create pixels of size close to one wavelength, $\lambda$, of the engraving light, which is the theoretical limit for such a focusing process, and with a location accuracy of greater than $\lambda/8$. This is the same order of magnitude as that of CD pits, or of the resolution obtainable by currently known photographic processes. Such pixel size and location accuracy are thus sufficient for the production of volume holograms by the method of this invention.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
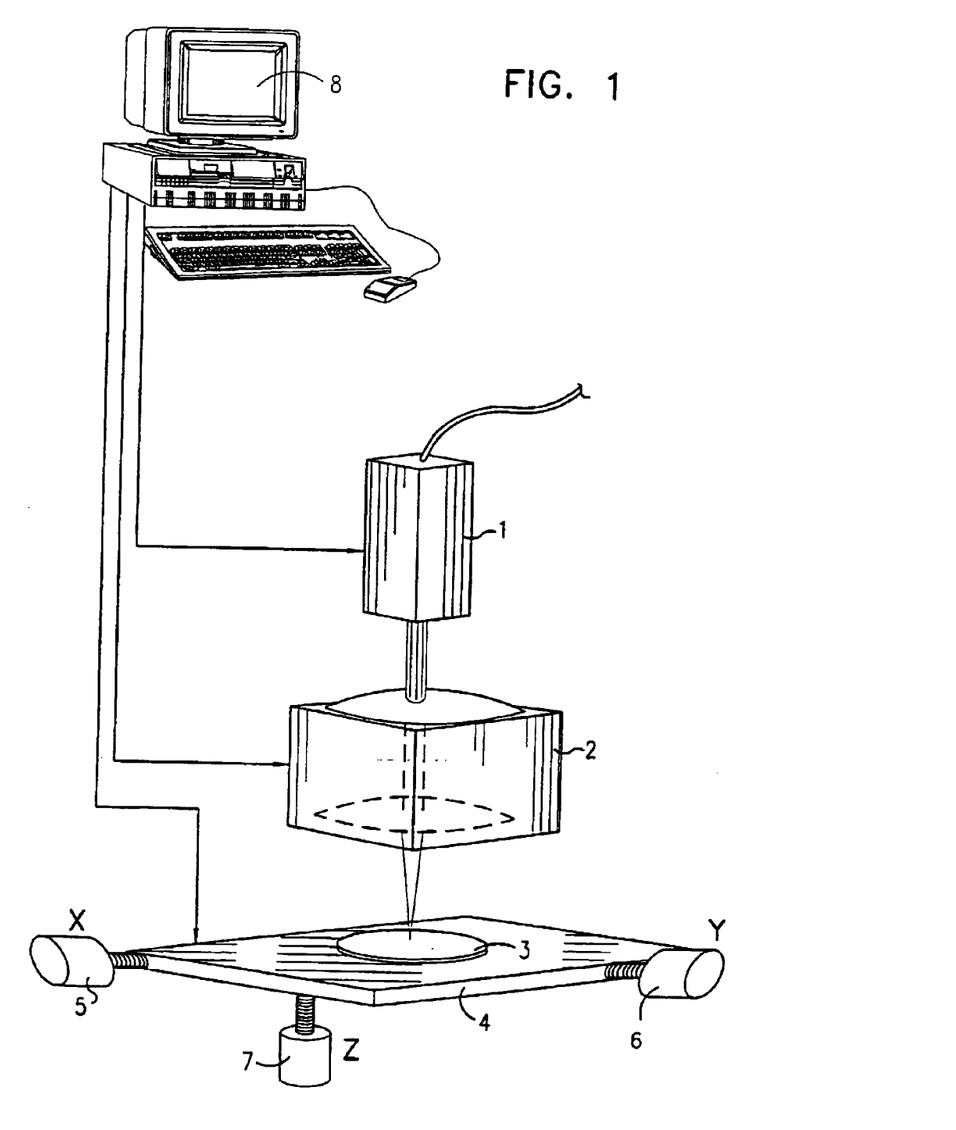
FIG. 1 is a schematic illustration of a computer controlled system for the production of computer generated volume holograms, constructed and operative according to a preferred embodiment of the present invention.

Reference is now made to FIG. 1, which illustrates schematically a computer controlled system for the production of computer generated volume holograms, constructed and operative according to a preferred embodiment of the present invention. A picosecond pulsed laser 1 emits a beam which is preferentially focused by means of a high quality optical system 2, into a transparent sample 3 in which the CGVH is to be produced. The laser pulse peak power, and the diffraction limit of the optical focusing system are such to ensure that the optical breakdown limit for the particular material of the sample is exceeded.

The sample is disposed on a CNC-controlled three-axis precision stage 4. The motions along the X-Y-Z axes is executed by means of CNC motors 5, 6, 7. A computer 8 is operative to control all of the functions of the system, synchronizing the firing of the laser pulses with the motion of the X-Y-Z axes, such that the required volume pattern of scattering points is formed in accordance with a predefined program. The method by which the predefined program determines the location of each scattering center is now described hereinbelow.

According to another preferred embodiment of the present invention, there is provided a method of producing computer generated volume holographs by means of computing the required pixel arrangement for the holograph, and then utilizing a system such as that shown in FIG. 1 to create each pixel using optical breakdown laser engraving. Since they are computer generated, such volume holograms are also known as digital volume holograms. Up to this time, the applicants have not been aware of any comprehensive mathematical theory for the development of such 3-D gratings. The standard electromagnetic theory of gratings is developed with reference to the Dirichlet problem for solution of the Helmholtz equation with infinite boundary conditions and with Sommerfeld radiation conditions. In our case, however, there is no regular boundary with predefined field values. An analogy can be made with custom 3-D holograms or with the first order of the Guigense-Fresnel principle.

It is theoretically possible to calculate the complete interference pattern between the reference light beam and the light scattered by the object. For a hologram with dimensions of the order of 1×1×1 cm, and a resolution of the order of 200 pixels/mm, the hologram contains a total of $8*10^9$ pixels. It is thus necessary to perform about $8*10^9$ calculations for the interaction of each wave constituting the model field with each pixel. If the model field is represented as a set of plane waves, constituting typically one million components, the task of representing the whole of the model field can thus be estimated as requiring $10^{15}$–$10^{16}$ computations of exponential functions. Such a task would require more than one year of computing time on a current, non-parallel computer. It is therefore obvious that this rigorous approach is unsuitable for practical solution of the model field problem.

By taking in account the short spatial coherence length of sunlight, this task can be considerably simplified. Pixels can be logically integrated in independent clusters, each of which is responsible for creating one or more waves of the model field. Using an analogy with known custom hologram theory, every part of the hologram can be considered to memorize its own fragment of the whole interference pattern, but at the reconstruction step, use is made only of those parts of the interference pattern that have a small optical path difference between the reference and scattered field.

Let $\overline{R}_0$ and $\overline{R}_j$ be the radius vectors of the center point of the cluster and of the j-th pixel respectively. Let $\overline{k}$ be the wave vector of the reference field. Then the resulting scattered field in the direction of the viewpoint $\overline{V}$, according to the Guigense-Fresnel principle, can be calculated as a sum of secondary waves:

$$\Phi = \sum_{j=0}^{N} \varepsilon_j e^{i\vec{k}(\vec{R}+\vec{r}_j)} \frac{e^{ikv_j}}{v_j} \quad (1)$$

where $\bar{r}_j = \overline{R}_j - \overline{R}_n$;

$\varepsilon_j$ is the scattered wave magnitude;

$\overline{v}_j = \overline{V} - \overline{R}_j$ is the vector from the j-th pixel to the direction of viewing, $v_j$ is the magnitude of this vector; and $\overline{v} = \overline{V} - \overline{R}_0$.

In the far zone, when for any j magnitude, $v=|\overline{v}|\gg r_j$, expression (1) can be written as:

$$\Phi(\vec{v}) = \frac{1}{v}\sum_{j=0}^{N} \varepsilon_j e^{i\vec{k}(\vec{R}_0+\vec{r}_j)} e^{ik(v-\vec{v}\vec{r}_j/v)} = \frac{e^{i\vec{k}\vec{R}_0}e^{ikv}}{v}\sum_{j=0}^{N}\varepsilon_j e^{i(\vec{k}-k\vec{v}/v)\vec{r}_j} \quad (2)$$

For a surface with a fixed magnitude of the vector $\overline{v}$, there is a simple Fourier representation of any space field which is even in $\overline{v}$, namely $\Phi(\overline{v})=\Phi(-\overline{v})$. This means that for real values of $\varepsilon_j$ a pair of images, one real and one virtual, are obtained.

Figure 2:
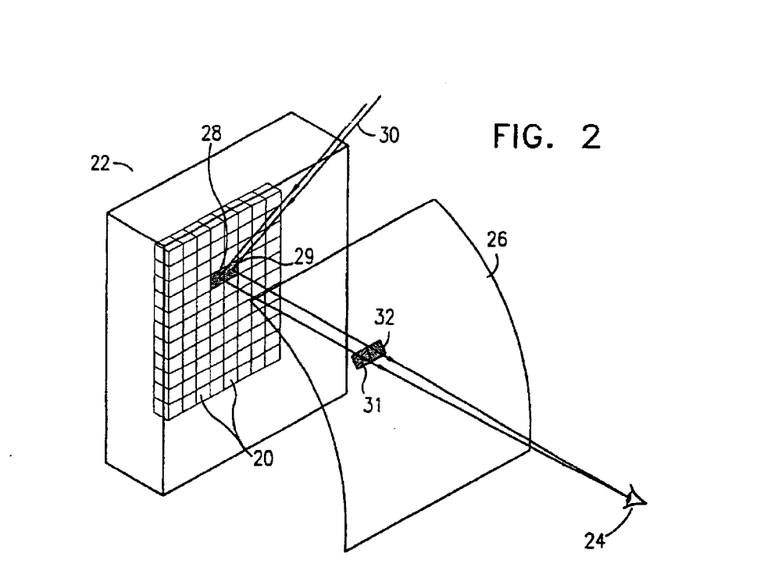
FIG. 2 is a visual description of the geometrical elements underlying methods used mathematically to build a volumetric holographic array using the system of FIG. 1.

Reference is now made to FIG. 2 which visually describes geometrical elements underlying the methods used mathematically to build the desired volumetric holographic array of pixels 20 within the transparent media 22. In order to calculate the spatial arrangement and scattering effect of the pixels, the field of the light scattered from the object should be calculated at the viewer's position 24. To do this, a mathematical description of the object must be created. This is called the virtual object 26. The incident light 30 is scattered by the pixels, and the waves of the scattered components from all of the pixels constitute the model field.

It is possible to assign the contribution of the light scattered from each pixel cluster to the waves of the model field. For example, the virtual object can be considered to be divided into small elements, hereinafter called facets. The size of the facets depends on the desired resolution. Consider a set of clusters 28, 29, located behind the virtual object 26 when seen from the viewer's position 24 through object facets 31, 32. Each cluster contributes to the waves from all the facets 31, 32, of the virtual object that can be observed from the viewer's position in the direction of that cluster., Thus, for instance, cluster 28 should produce a wave that simulates the wave reflected or radiated from the virtual object facet 31, and so on. The resulting diffraction from all of the clusters in the volume hologram produces a set of waves that simulates the reflection or scattering from the virtual object. This simplifies the calculations, since the scattered waves and the model field then have the same phase surfaces. There are three degrees of freedom, two of which are used to built the desired $\Phi(\overline{v})$ in equation (2) at the viewer's position for a fixed wave vector $\overline{k}$ of the reference field, and one of which is needed to select the necessary magnitude of $\overline{k}$ from the white reference field to build a chromatic image.

Figure 3:
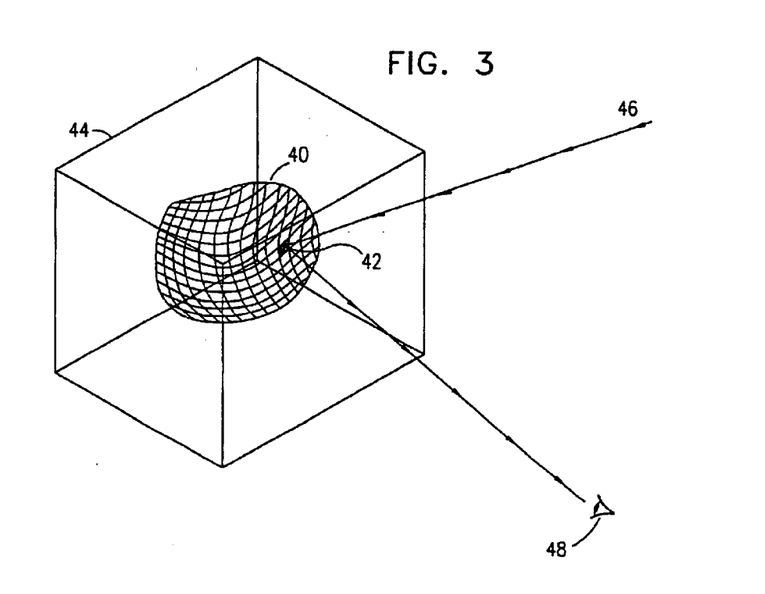
FIG. 3 is a schematic illustration of the production of a three-dimensional digital volume holograms containing iridescent 3-D images.

Three-dimensional digital volume holograms can be produced by several other methods according to more preferred embodiments of the present invention. In one preferred embodiment, illustrated in FIG. 3, the polychromatic iridescent effects arising from periodic structures are used to produce specific iridescent 3-D images inside transparent materials. This is performed by constructing 3-D images 40 from small clusters 42, periodically arranged within the transparent medium 44. Each cluster represents a fragment of a 3-D image, with its facet and color dependent on the directions of the incident light 46 and the viewer position 48. The position of each cluster is the same as the position of its corresponding facet.

Figure 4:
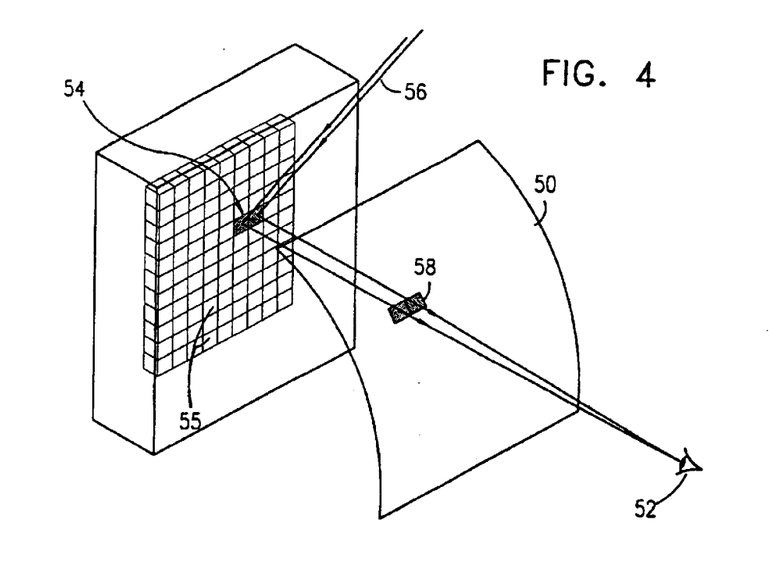
FIG. 4 is a schematic illustration of another preferred embodiment of the present invention, of a chromatic image, which can be seen from one viewer position.

FIG. 4 is a schematic illustration of another preferred embodiment of the present invention, wherein a chromatic image 50, which can be seen correctly from only one viewer position 52, is created from a plane array of clusters 54. This is achieved by arranging pixels in clusters in the form of a simple diffraction grating 54, so as to diffract the desired wavelength of the incident light 56 in the direction of the viewer position 52. Each cluster contributes only one wavelength, but all have the same effective diffraction lattice, but each with a different orientation with respect to the viewer position. Therefore, each cluster represents a different facet 58 of the 3-D image, its color depending on the illumination direction and viewer position. The position of each cluster defines the position of a corresponding facet in the image, such that the facet lies on a straight line from the viewer to the cluster.

Figure 5:
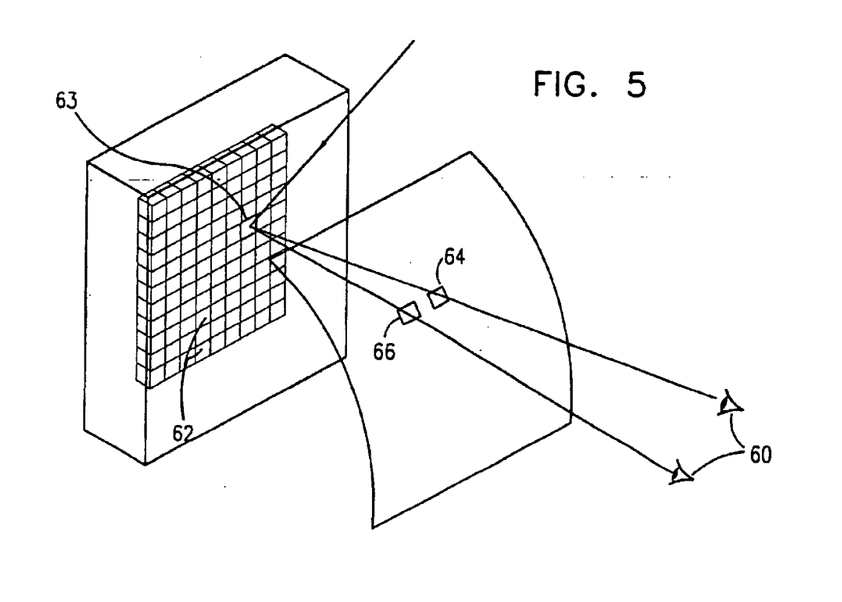
FIG. 5 is a schematic illustration of another preferred embodiment of the present invention, showing a method for the production of a stereoscopic holographic image for two viewer positions, corresponding to the positions of a pair of human eyes.

Yet another preferred embodiment of the present invention is illustrated in the schematic drawing of FIG. 5, which shows the production of a stereoscopic holographic image. This is achieved by constructing the hologram for two viewer positions, corresponding to the positions of a pair of human eyes 60. The grating 62 associated with each cluster is then a superposition of two simple lattices. This only affects the number of clusters or the Fourier composition of each cluster. Each cluster 63 represents up to two facets 64, 66, of a 3-D image. Corresponding facets lie on the lines from cluster to viewer eye positions. Each cluster contributes up to two wavelengths of the image, according to the predetermined illumination direction and viewer positions. Some clusters do not contribute anything to the image, since they are not located behind the virtual object with respect to either of the viewer eye positions; some of them contribute only one wavelength because only for one viewer position are they behind the virtual object, some of them contribute two wavelengths, since they are both correctly located with respect to lines drawn from the viewer's eyes through the virtual object. This concept can be visualized more clearly by analogy with the shadow of an object formed from two sources of light located at the viewer's eye positions. There will be regions with two shadows, with one shadow and without any shadow. This is analogous to the distribution of the contributions of each cluster to the image.

Figure 6:
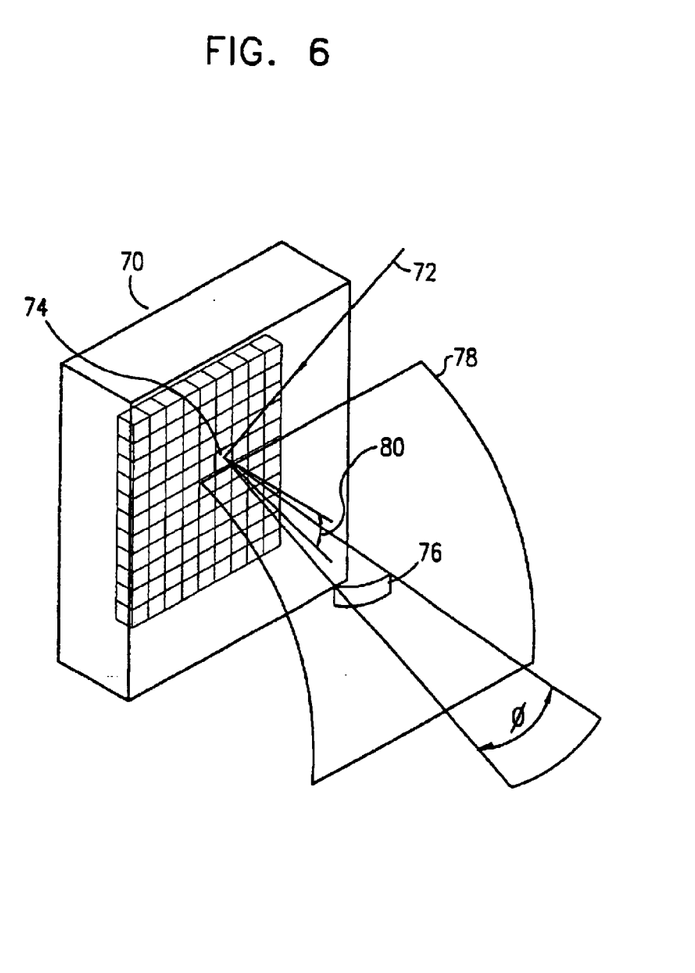
FIG. 6 schematically illustrates a further preferred embodiment of the present invention, by which an image viewable from multiple positions is constructed.

Reference is now made to FIG. 6, which schematically illustrates a further preferred embodiment of the present invention, by which an image viewable from multiple positions is constructed. FIG. 6 shows, as an example, a CGVH constructed so that when illuminated from a predetermined direction 72, each cluster 74 scatters the light so as to produce a range of facets 76 in the virtual object, thus forming an image which is viewable from a range of azimuthal positions Qp, having the same tilt angles with respect to a normal 80 from the plane of the CGVH. This is extension of the stereoscopic CGHV shown in FIG. 5, and the number of possible positions from which the image is visible depends on the resolution possible from the engraving technique used.

All of the above embodiments describe the production of CGVH's by means of the creation of an image of a real object. In addition, a digital version of a conventional hologram can also be produced. This can be done, for example, by sampling and quantization of an interference pattern, analogously to the custom sampling and quantization in 2D computer graphics. An ideal, virtual, smooth interference pattern is sampled by means of a step function to provide discreet digital values. This function can then be optimized by any convenient mathematical technique, for example, by means of genetic evolutionary algorithms as described by David Brown and Alan Kathman in SPIE. Vol. 2404, pp. 17–27, (1995).

Finally, according to a further embodiment of the present invention, a mathematical hologram, consisting of any specific mathematical arrangement of pixels, can be produced to obtain a desired diffraction effect. In this embodiment, the pixel arrangement is not based on a real object field, but on a virtual field, specifically computer generated to provide the holographic image desired.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A method of producing in a solid transparent material, a hologram of an object, comprising the steps of:

developing a three-dimensional mathematical model of an electro-magnetic field emanating from said object, said field producing an image of said object;

providing a pulsed laser beam, said beam being capable, when focused, of causing optical breakdown damage in said solid transparent material, each point of said optical breakdown damage being a light scattering center;

computing a three-dimensional set of points, such that light scattered from scattering centers located at said set of points holographically reconstructs said three-dimensional model; and focusing said pulsed laser beam within said solid transparent material to create a set of scattering centers corresponding to said computed three-dimensional set of points, said set of scattering centers, collectively defining said hologram.

2. The method of claim 1, wherein the length of the pulses of said pulsed laser beam are less than teas of picoseconds.

3. The method of claim 1, wherein said object is a real object.

4. The method of claim 1, wherein said object is a virtual object.

5. The method of claim 1, further comprising the step of arranging said set of points as a set of diffraction lattices.

6. The method of claim 5, wherein said set of diffraction lattices are such that light diffracted from said scattering centers located at said set of points forms a three-dimensional colored image.

7. The method of claim 5, wherein said set of diffraction lattices are such that light diffracted from said scattering centers located at said set of points forms a steroscopic image.

8. The method of claim 5, wherein said set of diffraction lattices are such that light diffracted from said scattering centers located at said set of points forms an image capable of being viewed from a plurality of angles.

* * * * *